US009691563B2

(12) United States Patent
Okazaki (10) Patent No.: US 9,691,563 B2
(45) Date of Patent: Jun. 27, 2017

(54) OPERATION UNIT (71) Applicant: OMRON Corporation, Kyoto-shi, Kyoto (JP)

(72) Inventor: Ryoji Okazaki, Aichi (JP)

(73) Assignee: OMRON Corporation, Kyoto (JP)

( * ) Notice: Subject to any disclaimer, the term of this patent is extended or adjusted under 35 U.S.C. 154(b) by 160 days.

(21) Appl. No.: 14/435,511

(22) PCT Filed: Sep. 10, 2013

(86) PCT No.: PCT/JP2013/005355
§ 371 (c)(1),
(2) Date: Apr. 14, 2015

(87) PCT Pub. No.: WO2014/080549
PCT Pub. Date: May 30, 2014

(65) Prior Publication Data
US 2015/0279580 A1     Oct. 1, 2015

(30) Foreign Application Priority Data

Nov. 22, 2012   (JP) .................. 2012-256803

(51) Int. Cl.
*H01H 3/12*   (2006.01)
*G06F 3/0338*   (2013.01)
(Continued)

(52) U.S. Cl.
CPC .............. *H01H 3/12* (2013.01); *G05G 9/047* (2013.01); *G06F 3/0338* (2013.01);
(Continued)

(58) Field of Classification Search
CPC .. H01H 13/023; H01H 2219/036; H01H 3/12; G06F 3/0338; G06F 3/0362; G05G 9/047
(Continued)

(56) References Cited

U.S. PATENT DOCUMENTS

| 8,957,331 | B2* | 2/2015 | Matsumoto | .......... H01H 25/041 200/4 |
| 9,012,794 | B2* | 4/2015 | Hisada | ..................... G05G 1/08 200/11 R |
| 2003/0206151 | A1* | 11/2003 | Oross | ....................... G05G 9/02 345/156 |

FOREIGN PATENT DOCUMENTS

| JP | 2004-062447 A | 2/2004 |
| JP | 2005-000548 A | 1/2005 |

(Continued)

OTHER PUBLICATIONS

International Search Report for corresponding International Search Report PCT/JP2013/005355, mailed Dec. 17, 2013 (1 page).

(Continued)

*Primary Examiner* — Edwin A. Leon
(74) *Attorney, Agent, or Firm* — Osha Liang LLP (57) ABSTRACT An operation unit includes an operation part that is provided to be movable up and down along a movement axis, functions as a push-button switch at a first position, and functions as a joystick lever at a second position above the first position in the movement axis direction; and an operation part-detecting part that senses pressing of the operation part when the operation part is at the first position, and senses a direction in which the operation part has inclined when the operation part is at the second position.

10 Claims, 8 Drawing Sheets (51) Int. Cl.
  *G06F 3/0362* (2013.01)
  *G05G 9/047* (2006.01)
  *H01H 13/02* (2006.01)
  H01H 25/04 (2006.01)
  H01H 25/06 (2006.01)
(52) U.S. Cl.
  CPC ......... *G06F 3/0362* (2013.01); *H01H 13/023* (2013.01); *H01H 25/04* (2013.01); *H01H 25/065* (2013.01); *H01H 2219/036* (2013.01)
(58) Field of Classification Search
  USPC .......................................................... 200/4
  See application file for complete search history.

(56) References Cited

FOREIGN PATENT DOCUMENTS

| | | |
|---|---|---|
| JP | 2006-517706 A | 7/2006 |
| JP | 2006-269367 A | 10/2006 |
| JP | 2007-287002 A | 11/2007 |
| JP | 2008-054696 A | 3/2008 |
| JP | 2009-279297 A | 12/2009 |
| JP | 2011-092378 A | 5/2011 |

OTHER PUBLICATIONS

Notification of Reasons for Refusal issued in corresponding Japanese Application No. 2012-256803, mailed on Aug. 30, 2016 (7 pages).

\* cited by examiner

OPERATION UNIT

CROSS-REFERENCE TO RELATED APPLICATIONS

This application claims the benefit of International Application PCT/JP2013/005355, filed on Sep. 10, 2013 and Japanese Patent Application No. 2012-256803, filed on Nov. 22, 2012, both of which are incorporated herein by reference in their entirety.

BACKGROUND

Technical Field

Embodiments of the present invention generally relate to an operation unit.

Related Art

Patent Literature 1 discloses a liquid crystal operation button for changing, according to a software program, characters, patterns, the number of bets or the number of lines that are to be displayed on a liquid crystal display apparatus and required for game operations. Because such a liquid crystal operation button makes it possible to change operation contents to be allocated to the liquid crystal button, the number of liquid crystal buttons can be reduced, and the installation space of the liquid crystal button can be reduced.

[Patent Literature 1] Japanese Patent Application Publication No. 2008-54696

One or more embodiments described below may reduce the installation space of an operation unit such as a button provided to a slot machine.

SUMMARY

An operation unit according to one or more embodiments of the present invention comprises: an operation part that is provided to be movable up and down along a movement axis, functions as a push-button switch at a first position, and functions as a joystick lever at a second position above the first position in the movement axis direction; and an operation part-detecting part that senses pressing of the operation part when the operation part is at the first position, and senses a direction in which the operation part has inclined when the operation part is at the second position.

The above-described operation unit may further comprise: a rotary body that has a through-hole, and rotates about a rotation axis that passes through the through-hole; and a rotary body-detecting part that detects rotation of the rotary body, wherein the operation part may be provided, inside the through-hole, to be movable up and down along the rotation axis direction.

The above-described operation unit may further comprise a rotary body light-emitting part that emits light responding to rotation of the rotary body being detected by the rotary body-detecting part.

In the above-described operation unit, the rotary body-detecting part may detect at least one of the amount of rotation, rotation speed, and direction of rotation of the rotary body, and the operation unit may further comprise a rotary body light-emission control part that controls a light-emission pattern of the rotary body light-emitting part based on the amount of rotation, rotation speed, or direction of rotation of the rotary body detected by the rotary body-detecting part.

In the above-described operation unit, the rotary body light-emitting part may have at least one rotary body light-emitting element, and the at least one rotary body light-emitting element may be provided below a peripheral area of the through-hole of the rotary body, and radiate light from at least either one of a periphery of the rotary body and the rotary body.

The above-described operation unit may further comprise an operation part light-emitting part that emits light responding to pressing of the operation part being sensed by the operation part-detecting part.

In the above-described operation unit, the operation part light-emitting part may have at least one operation part light-emitting element, and the at least one operation part light-emitting element may be positioned below the operation part, and radiate light that is to penetrate through the operation part.

In the above-described operation unit, the operation part-detecting part may: have a first detecting part that outputs a first sensing signal when the operation part has inclined in a first direction, and a second detecting part that outputs a second sensing signal when the operation part has inclined in an opposite direction to the first direction; and sense that the operation part has been pressed when the second detecting part outputs the second sensing signal while the first detecting part is outputting the first sensing signal.

In the above-described operation unit, the operation part-detecting part may further have a third detecting part that outputs a third sensing signal when the operation part has inclined in a second direction that is vertical to the first direction, and a fourth detecting part that outputs a fourth sensing signal when the operation part has inclined in an opposite direction to the second direction.

The summary clause does not necessarily describe all necessary features of one or more embodiments of the present invention. One or more embodiments of the present invention may also be a sub-combination of the features described above.

DETAILED DESCRIPTION

Hereinafter, one or more embodiments of the present invention will be described. The embodiment(s) do(es) not limit the invention according to the claims, and all the combinations of the features described in the embodiment(s) are not necessarily essential to means provided by aspects of the invention.

Figure 1:
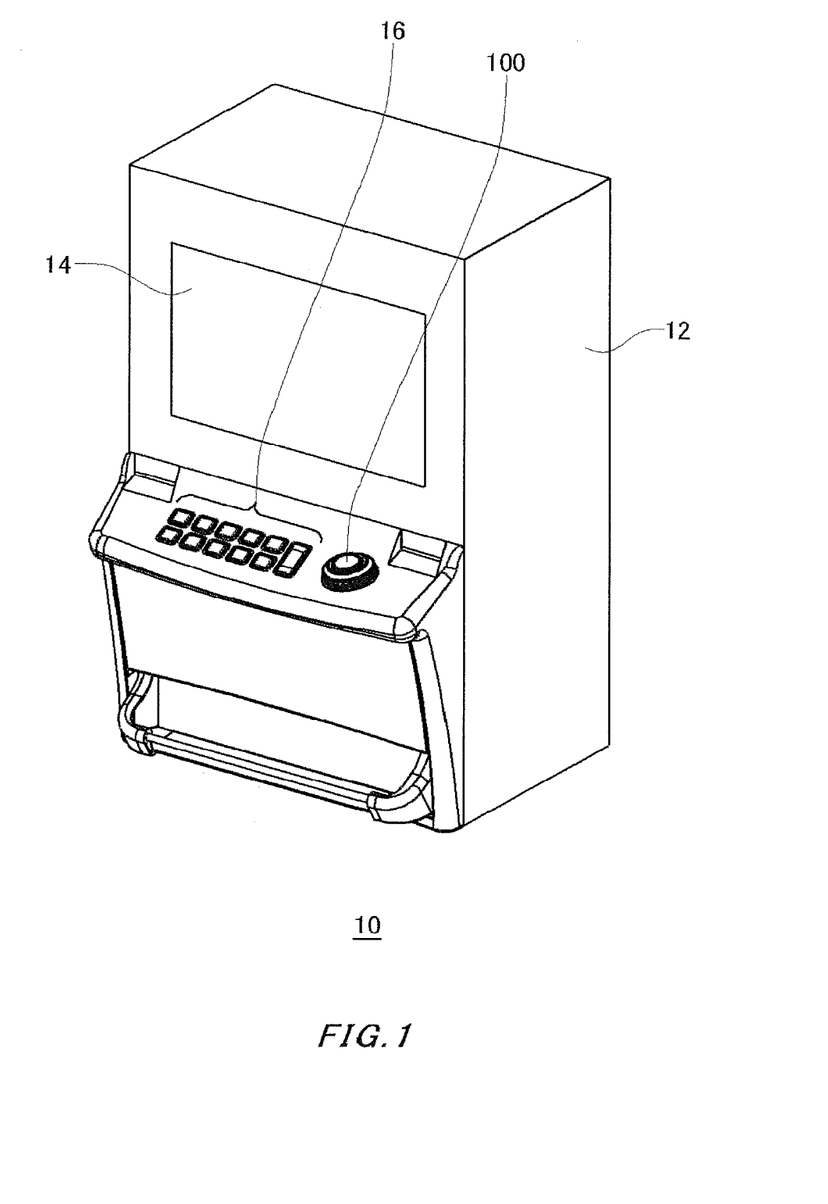
FIG. 1 is an external perspective view of a slot machine according to one or more embodiments.

FIG. 1 is one example of an external perspective view of a slot machine 10 according to one or more embodiments. The slot machine 10 comprises a main body 12, a display part 14, a setting button set 16, and an operation unit 100. The slot machine 10 is one example of game machines. Note that the operation unit 100 may be mounted on other game machines such as Japanese pinballs, Japanese slot machines, and game consoles.

The display part 14 may display game images including a plurality of reels indicating multiple types of patterns, winning lines that define combinations of patterns, and the number of bets that indicate a money amount betted on winning lines. Other than primary games of game machines, the display part 14 may display images about a so-called mini game that is started under predetermined conditions during the games. The setting button set 16 receives, from a player, an instruction to set the number of lines of winning lines, and the number of bets on the winning lines. The operation unit 100 receives, from a user, an instruction about rotation of a reel, a plurality of items, for example an instruction about selection of a mini game to be performed from among a plurality of mini games, and an instruction about operation in the mini game.

Figure 2:
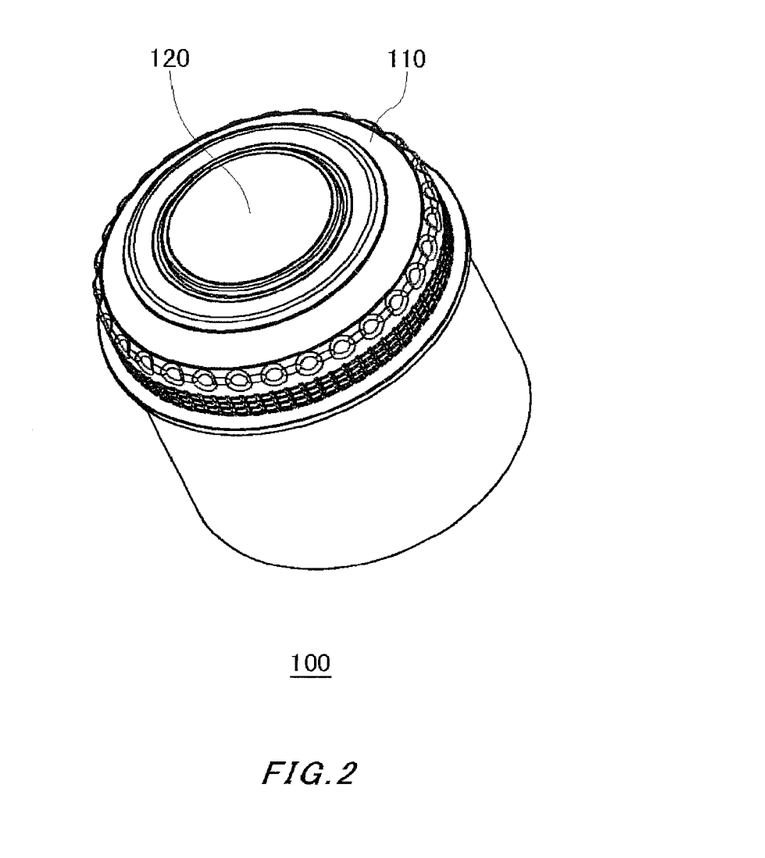
FIG. 2 is an external perspective view of an operation unit when an operation part is at a first position according to one or more embodiments.
Figure 3:
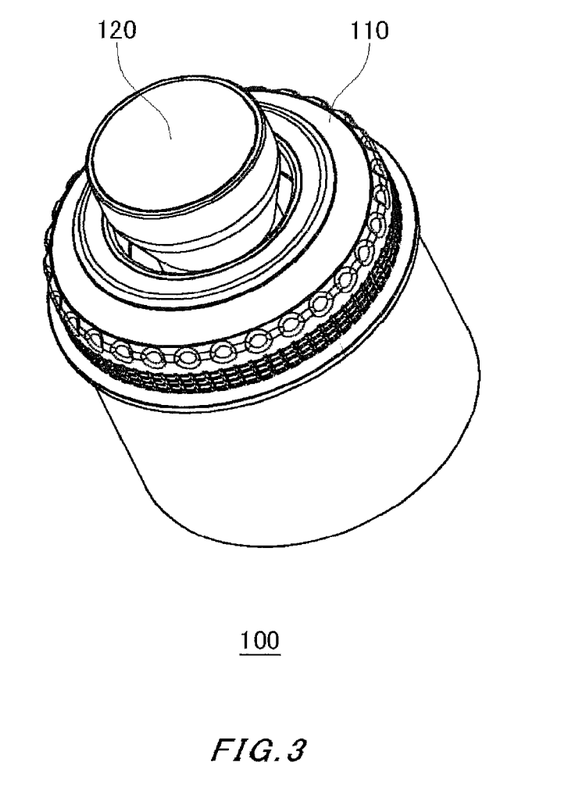
FIG. 3 is an external perspective view of an operation unit when an operation part is at a second position according to one or more embodiments.

FIG. 2 and FIG. 3 illustrate external perspective views of one or more embodiments of the operation unit 100. The operation unit 100 comprises a rotary body 110 and an operation part 120. The operation part 120 is provided to be movable up and down along a movement axis, and functions as a push-button switch at a first position illustrated in FIG. 2. The operation part 120 functions as a joystick lever at a second position illustrated in FIG. 3 above the first position in the movement axis direction. The rotary body 110 has a through-hole, and rotates about a rotation axis that passes through the through-hole. The operation part 120 is provided, inside the through-hole of the rotary body 110, to be movable up and down along the rotation axis direction.

The rotary body 110 receives, from a player, an instruction to rotate the reel. When the player rotates the rotary body 110, rotation of the reel is started. The rotary body 110 is, at its periphery around the through-hole, configured with a transparent or semi-transparent material, and transmits light that is irradiated from a light-emitting part provided inside the operation unit 100. Responding to the rotary body 110 being rotated about the rotation axis that passes through the through-hole, a periphery around the through-hole of the rotary body 110 is illuminated with light that is irradiated from the light-emitting part.

Also, a pressing surface of the operation part 120 is configured with a transparent or semi-transparent material, and transmits light that is irradiated from another light-emitting part provided inside the operation unit 100. Responding to the operation part 120 being pressed, the pressing surface of the operation part 120 is illuminated with light that is irradiated from the other light-emitting part.

In this manner, by placing the operation part 120 that functions as a joystick lever and a push-button switch, inside the rotary body 110 that receives an instruction, for example, to rotate the reel, the installation space for the operation button and the like can be reduced. Also, responding to rotation of the rotary body 110 or pressing of the operation part 120, the rotary body 110 or the operation part 120 is illuminated with light. Therefore, the decorativeness of the operation unit 100 can be improved.

Figure 4:
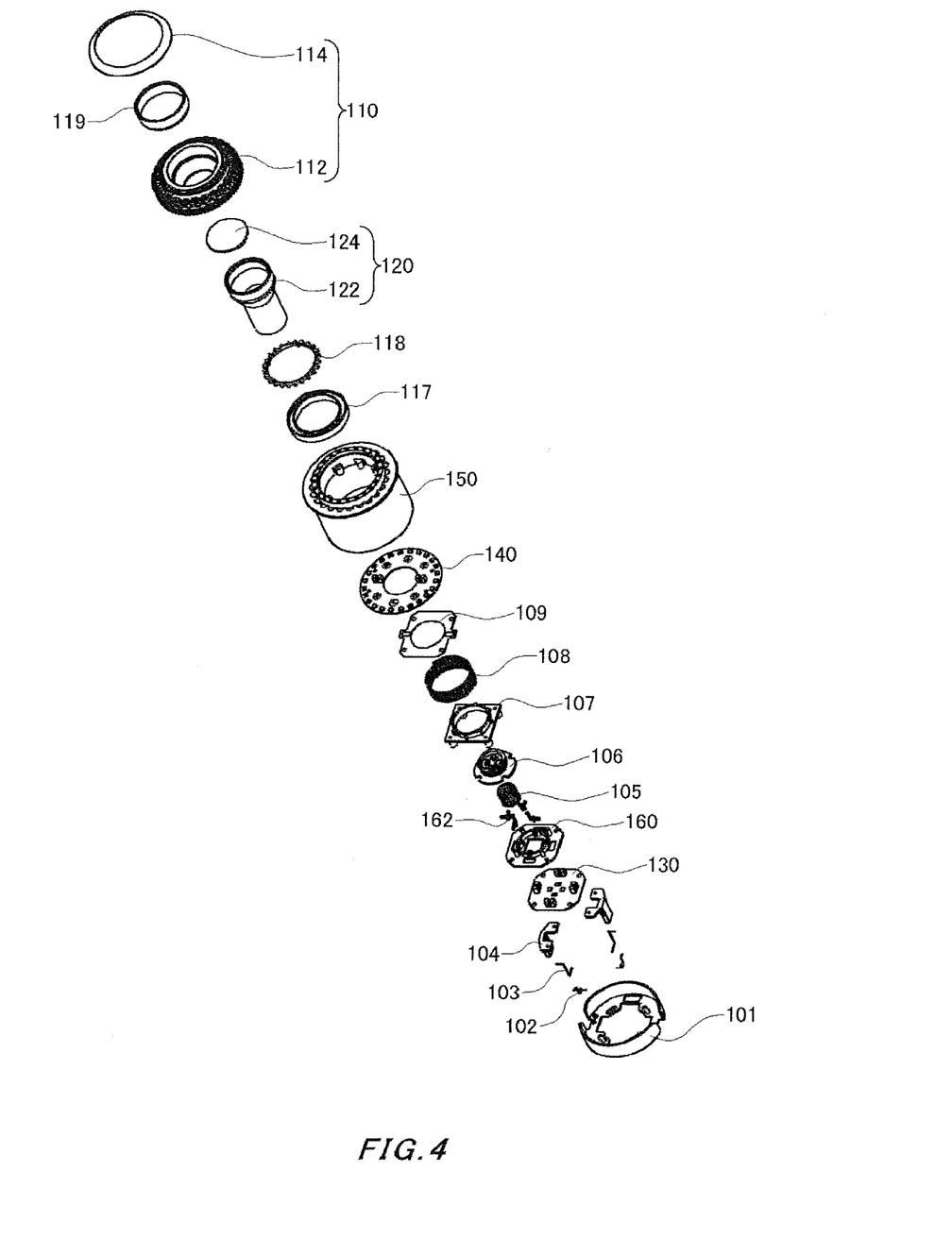
FIG. 4 is an exploded perspective view of an operation unit according to one or more embodiments.

FIG. 4 illustrates an exploded perspective view of one or more embodiments of the operation unit 100. The operation unit 100 comprises a lower part cover 101, position keeping tension springs 102, position keeping shafts 103, position keeping members 104, an operation spring 105, a base plate 130, a flag bracket 160, flags 162, an operation part-fixing screw plate 106, an operation part-fixing bracket 107, a position keeping spring 108, an insulation sheet 109, a base plate 140, a case 150, a bearing 117, a weight 118, an operation part 120, a resin bearing 119, and a rotary body 110.

The operation part 120 has a hollow main body part 122, and a lid part 124 that covers an opening above the main body part 122. The lid part 124 is configured with a transparent or semi-transparent material. The rotary body 110 has a rotary main body 112, and a ring body 114 that covers a part of the upper surface of the rotary main body 112 in a ring-like manner. The ring body 114 is configured with a transparent or semi-transparent material. The weight 118 is fixed to the rotary body 110, and the rotation speed and rotation duration of the rotary body 110 are controlled by the weight of the weight 118.

Figure 5:
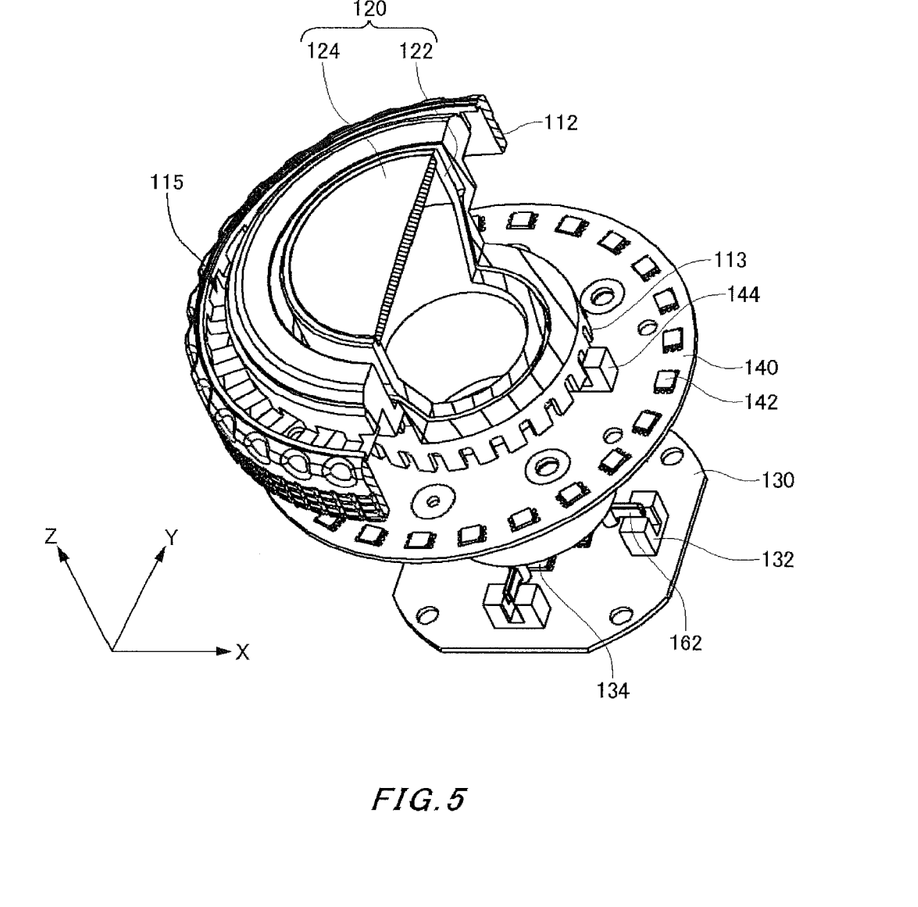
FIG. 5 is a perspective view of some of components of an operation unit according to one or more embodiments.

FIG. 5 illustrates a perspective view of some of components of the operation unit 100 according to one or more embodiments. Four transmission-type photo-interrupters 132 are placed on the base plate 130. A pair of transmission-type photo-interrupters 132 among the four transmission-type photo-interrupters 132 are placed to be opposite to each other in the X-axis direction. One of the pair of transmission-type photo-interrupters 132 functions as a first detecting part that outputs a first detection signal when the operation part 120 has inclined in the X-axis positive direction. The other of the pair of transmission-type photo-interrupters 132 functions as a second detecting part that outputs a second detection signal when the operation part 120 has inclined in the X-axis negative direction. When the pair of transmission-type photo-interrupters 132 output detection signals, respectively, the pair of transmission-type photo-interrupters 132 sense that the operation part 120 is pressed.

The other pair of transmission-type photo-interrupters 132 among the four transmission-type photo-interrupters 132 are placed to be opposite to each other in the Y-axis direction. One of the other pair of transmission-type photo-interrupters 132 functions as a third detecting part that outputs a third detection signal when the operation part 120 has inclined in the Y-axis positive direction. The other of the other pair of transmission-type photo-interrupters 132 functions as a fourth detecting part that outputs a fourth detection signal when the operation part 120 has inclined in the Y-axis negative direction. When the other pair of transmission-type photo-interrupters 132 output detection signals, respectively, the other pair of transmission-type photo-interrupters 132 may sense that the operation part 120 is pressed.

By detecting the flags 162, the transmission-type photo-interrupters 132 sense the direction in which the operation part 120 has inclined and pressing of the operation part 120. The transmission-type photo-interrupters 132 are one example of an operation part-detecting part. Note that in one or more embodiments, an example in which the transmission-type photo-interrupters 132 are commonly used as the operation part-detecting part that senses the direction in which the operation part 120 has inclined and pressing of the operation part 120 is explained. However, the operation unit 100 may separately comprise a sensing part such as a transmission-type photo-interrupter that senses the direction in which the operation part 120 has inclined, and a sensing part such as a transmission-type photo-interrupter that senses pressing of the operation part 120.

A plurality of LEDs 134 is placed at a central portion of the base plate 130. The plurality of LEDs 134 emit light responding to pressing of the operation part 120 being sensed by the transmission-type photo-interrupters 132. The plurality of LEDs 134 is positioned below the operation part 120, and radiates light to penetrate through the operation part 120. The light that is irradiated from the plurality of LEDs 134 passes though the inside of the main body part 122, and penetrates the lid part 124. The plurality of LEDs 134 is one example of an operation part light-emitting part and an operation part light-emitting element.

The base plate 140 is placed above the base plate 130. The base plate 140 has a disk-like shape, and a plurality of LEDs 142 is placed on the base plate 140 and along its edge part. Two transmission-type photo-interrupters 144 are placed inside the plurality of LEDs 142 on the base plate 140. The rotary main body 112 has, at its lower part, a plurality of pieces to be detected 113. The plurality of pieces to be detected 113 are placed circumferentially at constant intervals. The two transmission-type photo-interrupters 144 detect the pieces to be detected 113, and detect the rotation speed, amount of rotation, and direction of rotation of the rotary body 110 based on the timing and intervals at which each transmission-type photo-interrupter 144 detects the pieces to be detected 113. The transmission-type photo-interrupters 144 are one example of a rotary body-detecting part.

The plurality of LEDs 142 is provided below a peripheral area of the through-hole of the rotary body 110, and radiates light from a periphery of the rotary body 110 and the rotary body 110.

The plurality of LEDs 142 is one example of a rotary body light-emitting part and a rotary body light-emitting element. The plurality of LEDs 142 may emit light of different colors depending on the amount of rotation or rotation speed of the rotary body 110. The plurality of LEDs 142 may emit light of different colors depending on the amount of rotation during continuous rotation of the rotary body 110.

The operation unit 100 further comprises a rotary body light-emission control part that controls a light-emission pattern of the plurality of LEDs 142 based on the amount of rotation, rotation speed, or direction of rotation of the rotary body 110 that is detected by the transmission-type photo-interrupters 144. The rotary body light-emission control part may be configured with a microcomputer for example. The microcomputer may be provided to the base plate 130.

The microcomputer may be provided outside the operation unit 100.

The rotary main body 112 has a plurality of through-holes 115 that is placed in the circumference area of the through-hole at which the operation part 120 is placed, and along the through-hole. The plurality of through-holes 115 is covered by the ring body 114. Light from the plurality of LEDs 142 penetrates the ring body 114 via the plurality of through-holes 115.

Figure 6:
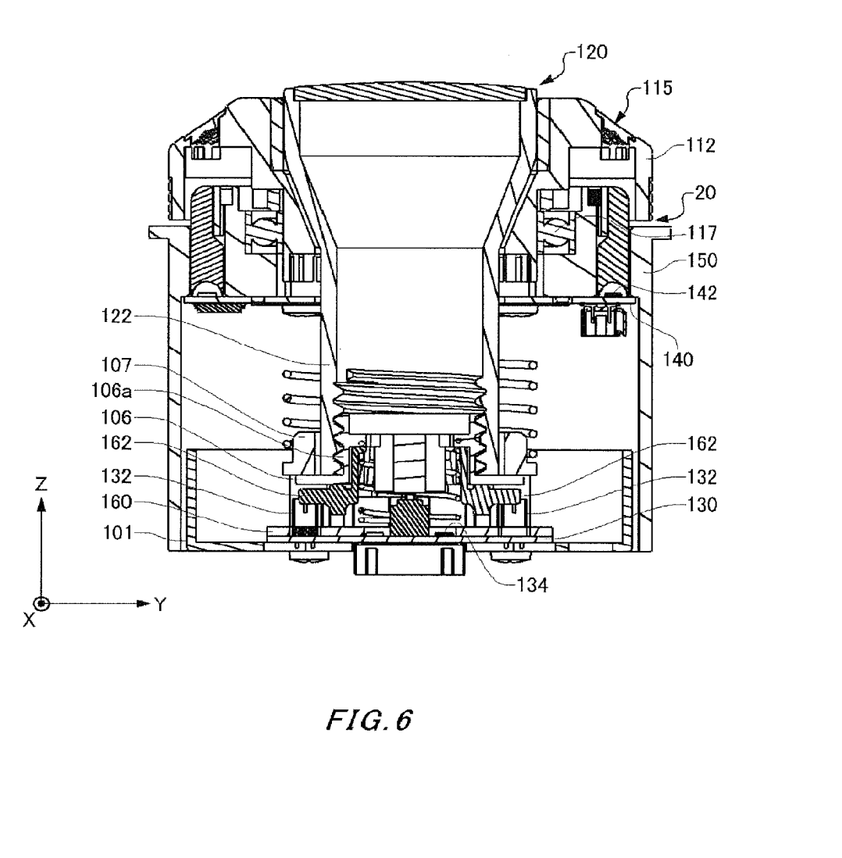
FIG. 6 is a sectional view of an operation unit when an operation part is at a first position according to one or more embodiments.

FIG. 6 illustrates a sectional view of the operation unit 100 illustrated in FIG. 2. In other words, FIG. 6 illustrates a sectional view of the operation unit 100 in a case that the operation part 120 is at the first position, and functions as a push-button switch.

The base plate 130 is placed on the upper surface of the bottom part of the lower part cover 101. The flag bracket 160 is placed on the base plate 130. Through-holes are formed in the flag bracket 160 at positions to face the transmission-type photo-interrupters 132, and light-emitting parts and light receiving parts of the transmission-type photo-interrupters 132 protrude through the through-holes. The flag bracket 160 supports the flags 162 at positions to face the transmission-type photo-interrupters 132. The operation part-fixing screw plate 106 is placed on the flag bracket 160. The operation part-fixing screw plate 106 has a hollow cylindrical protruding part 106a whose outer circumferential surface has screw threads formed thereon. Screw threads are formed also on the inner circumferential surface of the main body part 122 of the operation part 120, and the main body part 122 is screwed to the operation part-fixing screw plate 106 via the protruding part 106a.

The operation part-fixing bracket 107 is placed on the operation part-fixing screw plate 106. The operation part-fixing bracket 107 is screwed to the lower part cover 101 with the operation part-fixing screw plate 106, the flag bracket 160, and the base plate 130 being sandwiched therebetween. The operation part-fixing screw plate 106 is supported by the flag bracket 160 via the operation spring 105. Thereby, the operation part 120, at the first position, is movable together with the operation part-fixing screw plate 106 up and down in the Z-axis direction, and functions as a push-button switch. Also, when the operation part 120 has moved to the second position above the first position, the operation part 120 can incline together with the operation part-fixing screw plate 106 relative to the base plate 130, and functions as a joystick lever.

The case 150 houses the lower part cover 101 such that the lower part cover 101 is movable in the Z-axis direction. The case 150 keeps the rotary main body 112 via the bearing 117 such that the rotary main body 112 is rotatable about a rotation axis that passes through the midpoint of the through-hole of the rotary main body 112. The base plate 140 is fixed to the case 150. The base plate 140 has a round through-hole at its central portion, and the main body part 122 of the operation part 120 is placed inside the through-hole. The plurality of LEDs 142 provided to the edge part of the base plate 140 emit light responding to the rotary main body 112 being rotated. The plurality of LEDs 142 radiate light from the rotary body 110 via the through-hole 115 formed in the rotary main body 112. Also, the plurality of LEDs 142 radiate light from a periphery of the rotary body 110 via a gap 20 that is opened between the case 150 and the rotary main body 112.

Figure 7:
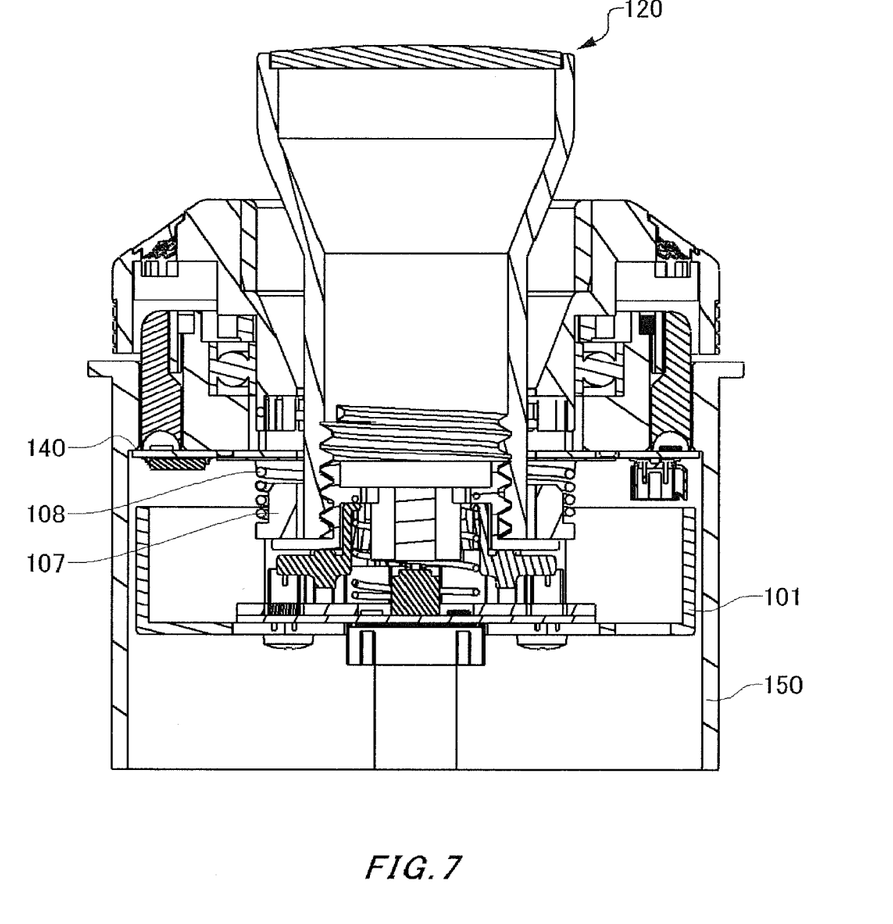
FIG. 7 is a sectional view of an operation unit when an operation part is at a second position according to one or more embodiments.

FIG. 7 illustrates a sectional view of one or more embodiments of the operation unit 100 illustrated in FIG. 3. In other words, FIG. 7 illustrates a sectional view of the operation unit 100 in a case that the operation part 120 is at the second position, and functions as a joystick lever.

When the operation part 120 functions as a joystick lever, the lower part cover 101 is moved upward in the Z-axis direction by a drive unit such as a motor provided outside. For example, when a mini game is started under a predetermined condition during a game, the lower part cover is moved upward in the Z-axis direction in order to move the operation part 120 from the first position to the second position by the drive unit. Thereby, the operation part 120 moves upward in the Z-axis direction together with the lower part cover 101.

The position keeping spring 108 is placed between the operation part-fixing bracket 107 that moves in the Z-axis direction together with the lower part cover 101 and the operation part 120, and the base plate 140 fixed to the case 150. Thereby, when the operation part 120 has moved to the second position, the operation part 120 is kept stably relative to the case 150 due to the elastic force of the position keeping spring 108.

Figure 8:
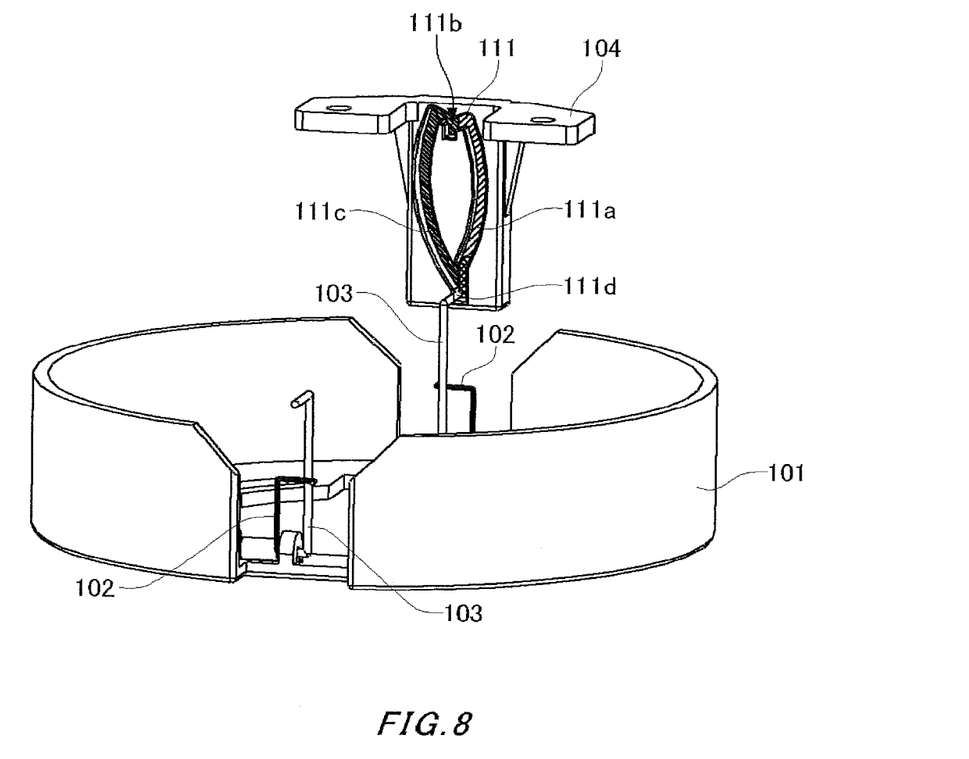
FIG. 8 is an external perspective view illustrating the positional relationship of a lower part cover, a position keeping tension spring, a position keeping shaft, and a position keeping member according to one or more embodiments.

FIG. 8 is an external perspective view illustrating the positional relationship of the lower part cover 101, the position keeping tension springs 102, the position keeping shafts 103, and the position keeping member 104.

The position keeping tension springs 102, the position keeping shafts 103, and the position keeping member 104 configure a so-called heart cam mechanism. FIG. 8 illustrates the positional relationship of respective ones of the position keeping tension springs 102, the position keeping shafts 103, and the position keeping member 104 when the operation part 120 is at the second position.

A heart cam groove 111 is formed in the position keeping member 104. The position keeping shafts 103 are fixed to the lower part cover 101 while being supported by the position keeping tension springs 102. The position keeping member 104 is fixed to the case 150.

The position keeping shaft 103 moves along a groove 111a of the heart cam groove 111 when the operation part 120 moves from the second position to the first position. Then, when the operation part 120 has moved to the first position, the position keeping shaft 103 moves to a groove 111b of the heart cam groove 111, and is locked. When the operation part 120 moves from the first position to the second position, the position keeping shaft 103 moves along a groove 111c of the heart cam groove 111. Then, when the operation part 120 has moved to the second position, the position keeping shaft 103 moves to a groove 111d of the heart cam groove 111, and is locked.

As described above, the operation unit 100 according to one or more embodiments enables reduction of the installation space of an operation button and the like by placing the operation part 120 that functions as a joystick lever and a push-button switch inside the rotary body 110 that receives an instruction to rotate a reel, and the like. When the space for adding an operation button and the like is small, for example, the display part 14 that is a main screen of a slot machine may be configured with a touch panel display, and the display part 14 may be allowed to function as an operation unit having another function. However, some players cannot reach for the display part 14 that is a main screen of a slot machine, or may feel it is bothersome to perform touch operation by using a touch panel display. Because the operation unit 100 according to one or more embodiments allows installation within a relatively small space, it is easy to install the operation unit 100 on an operation board that is originally provided to the main body 12 of the slot machine 10. Therefore, it is possible to easily install the operation unit 100 in which a plurality of operation functions are integrated, at a location that allows easy operation even for a player who does not prefer the above-mentioned touch panel display.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An operation unit comprising:
an operation part that is movable up and down along a movement axis, functions as a push-button switch at a first position, and functions as a joystick lever at a second position above the first position in the movement axis direction;
an operation pad-detecting, part that senses pressing of the operation part when the operation part is at the first position, and senses a direction in which the operation part has inclined when the operation part is at the second position;
a rotary body that comprises a through-hole, and rotates about a rotation axis that passes through the through-hole;
a rotary body-detecting part that detects rotation of the rotary body; and
a rotary body light-emitting part that emits light responding to rotation of the rotary body being detected by the rotary body-detecting part,
wherein the operation part is, inside the through-hole movable up and down along the rotation axis direction.

2. The operation unit according to claim 1, wherein
the rotary body-detecting part detects at least one of the amount of rotation, rotation speed, and direction of rotation of the rotary body, and
the operation unit further comprises a rotary body light-emission control part that controls a light-emission pattern of the rotary body light-emitting part based on the amount of rotation, rotation speed, or direction of rotation of the rotary body detected by the rotary body-detecting part.

3. The operation unit according to claim 1, wherein
the rotary body light-emitting part comprises at least one rotary body light-emitting element, and
the at least one rotary body light-emitting element is disposed below a peripheral area of the through-hole of the rotary body, and radiates light from at least either one of a periphery of the rotary body and the rotary body.

4. The operation unit according to claim 1, further comprising an operation part light-emitting part that emits light responding to pressing of the operation part being sensed by the operation part-detecting part.

5. The operation unit according to claim 4, wherein
the operation part light-emitting part comprises at least one operation part light-emitting element, and
the at least one operation part light-emitting element is disposed below the operation part, and radiates light that is to penetrate through the operation part.

6. The operation unit according to claim 1, wherein
the operation part-detecting part further comprises:
a first detecting part that outputs a first sensing signal when the operation part has inclined in a first direction, and
a second detecting part that outputs a second sensing signal when the operation part has inclined in an opposite direction to the first direction; and senses that the operation part has been pressed when the second detecting outputs the second sensing signal while the first detecting part is outputting the first sensing signal.

7. The operation unit according to claim 6, wherein the operation part-detecting part further comprises:
a third detecting part that outputs a third sensing signal when the operation part has inclined in a second direction that is vertical to the first direction, and
a fourth detecting part that outputs a fourth sensing signal when the operation part has inclined in an opposite direction to the second direction.

8. An operation unit comprising:
an operation part that is movable up and down along a movement axis, functions as a push-button switch at a first position, and functions as a joystick lever at a second position above the first position in the movement axis direction;
an operation part-detecting part that senses pressing of the operation part when the operation part is position and senses a direction in which the operation part has inclined when the operation part is at the second position; and
an operation part light-emitting part that emits light responding to pressing of the operation part being sensed by the operation part-detecting part,
wherein the operation part light-emitting part comprises at least one operation part light-emitting element, and
wherein the at least one operation part light-emitting element is disposed below the operation part, and radiates light that is to penetrate through the operation part.

9. An operation unit comprising:
an operation part that is movable up and down along a movement axis, functions as a push-button switch at a first position, and functions as a joystick lever at a second position above the first position in the movement axis direction; and
an operation part-detecting part that senses pressing of the operation part when the operation part is at the first position, and senses a direction in which the operation part has inclined when the operation part is at the second position,
wherein the operation part-detecting part further comprises:
a first detecting part that outputs a first sensing signal when the operation part has inclined in a first direction, and
a second detecting part that outputs a second sensing signal when the operation part has inclined in an opposite direction to the first direction; and senses that the operation part has been pressed when the second detecting part outputs the second sensing signal while the first detecting part is outputting the first sensing signal.

10. The operation unit according to claim 9, wherein the operation part-detecting part further comprises:
a third detecting part that outputs a third sensing signal when the operation part has inclined in a second direction that is vertical to the first direction, and
a fourth detecting part that outputs a fourth sensing signal when the operation part has inclined in an opposite direction to the second direction.

* * * * *

UNITED STATES PATENT AND TRADEMARK OFFICE
CERTIFICATE OF CORRECTION

PATENT NO.        : 9,691,563 B2
APPLICATION NO.   : 14/435511
DATED             : June 27, 2017
INVENTOR(S)       : Ryoji Okazaki It is certified that error appears in the above-identified patent and that said Letters Patent is hereby corrected as shown below:

In the Claims

At Column 8, Claim 1, Line 18, the words "pad-detecting, part" should read -- part-detecting --.

At Column 9, Claim 8, Line 20, the words "is position" should read -- is at the first position --.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*